(12) United States Patent
Minelli (10) Patent No.: US 8,938,941 B2
(45) Date of Patent: Jan. 27, 2015

(54) APPARATUS FOR PICKING OLIVES AND THE LIKE

(75) Inventor: Ermanno Minelli, Correggio (IT)

(73) Assignee: Minelli Elettromeccanica, Correggio (RE) (IT)

( * ) Notice: Subject to any disclaimer, the term of this patent is extended or adjusted under 35 U.S.C. 154(b) by 259 days.

(21) Appl. No.: 13/695,808

(22) PCT Filed: Feb. 21, 2011

(86) PCT No.: PCT/EP2011/052546
§ 371 (c)(1),
(2), (4) Date: Nov. 2, 2012

(87) PCT Pub. No.: WO2011/138058
PCT Pub. Date: Nov. 10, 2011

(65) Prior Publication Data
US 2013/0047571 A1    Feb. 28, 2013

(30) Foreign Application Priority Data

May 4, 2010 (IT) .............................. BO2010A0282

(51) Int. Cl.
*A01D 46/24* (2006.01)
*A01D 46/26* (2006.01)
(52) U.S. Cl.
CPC .................................. *A01D 46/264* (2013.01)
USPC .......................................................... 56/332
(58) Field of Classification Search
USPC ................... 56/328.1, 330, 332, 333, 400.02
See application file for complete search history.

(56) References Cited

U.S. PATENT DOCUMENTS

| 2,972,851 | A | * | 2/1961 | Goehring | 56/328.1 |
| 3,232,034 | A | * | 2/1966 | Green | 56/332 |
| 3,389,543 | A | * | 6/1968 | Clark | 56/337 |

(Continued)

FOREIGN PATENT DOCUMENTS

| EP | 1040747 A1 | 10/2000 |
| EP | 1323342 B1 | 1/2007 |

(Continued)

*Primary Examiner* — Thomas B Will
*Assistant Examiner* — Mai Nguyen
(74) *Attorney, Agent, or Firm* — McGlew and Tuttle, P.C.

(57) ABSTRACT

The apparatus for picking olives and similar products comprises a support rod (2) suitable to be grasped, a shaker unit (3) comprising a containment box (7) suitable to be mounted at the top of the support rod (2); at least one comb sector (5, 6) shaping a crossbar (9) provided with a plurality of teeth (10), carried mobile by the containment box (7), a motor member (204) to actuate the comb sector (5, 6) in a substantially tilting motion, a drive shaft (14) arranged substantially aligned to the longitudinal axis of the support rod (2) and suitable to be actuated in a rotary motion by the motor member (204). The drive shaft (14) is associated with at least one respective driven shaft (18, 19) shaping an inclined end portion (23). Support means (25) for the crossbar (9) of the comb sector (5, 6) are suitable to be engaged rotatably on the inclined portion (23) of the driven shaft (18, 19) by means of the interposition of rolling means (28). Control means (13) for the motion of the comb sector (5, 6) are associated with the support means (25), the support means (25) being suitable to cooperate reciprocally abutting with the control means (13) at respective coupling portions (30, 31) externally to the containment box (7), to transform the rotary motion actuated by the motor member (204) into the tilting motion of the comb sector (5, 6).

11 Claims, 9 Drawing Sheets

(56) References Cited

U.S. PATENT DOCUMENTS

| | | | |
|---|---|---|---|
| 4,321,786 A * | 3/1982 | Burton | 56/330 |
| 4,538,405 A * | 9/1985 | Alexandrino | 56/330 |
| 4,611,461 A * | 9/1986 | Tyros | 56/328.1 |
| 4,974,405 A * | 12/1990 | Littau | 56/330 |
| 5,099,637 A * | 3/1992 | Drusiani | 56/332 |
| 5,347,800 A * | 9/1994 | Morgan | 56/335 |
| 5,437,146 A * | 8/1995 | Erickson | 56/330 |
| 5,916,115 A * | 6/1999 | Pavone | 56/330 |
| D589,312 S * | 3/2009 | Tinius | D8/13 |
| 7,958,651 B2 * | 6/2011 | Maniha | 34/86 |

FOREIGN PATENT DOCUMENTS

| | | |
|---|---|---|
| EP | 1795064 A1 | 6/2007 |
| EP | 2091317 A1 | 8/2009 |
| GR | 97100436 A | 7/1999 |
| WO | 03/030625 A1 | 4/2003 |
| WO | 2008071702 A1 | 6/2008 |

* cited by examiner

APPARATUS FOR PICKING OLIVES AND THE LIKE

TECHNICAL FIELD

The present invention regards an apparatus for picking olives and similar small products.

BACKGROUND ART

It has been known that to perform the picking of olives or other similar small products, picking apparatuses are used, commonly named knocker down, suitable to act on the branches of fruit trees, shaking them, in order to provoke the detachment and then the falling down of the fruits.

Such knocker down devices generally comprise a supporting rod, preferably of the telescopic type, suitable to be carried by an agricultural machine, or manually by an operator at a suitable end handle. At the free end, the rod carries a series of shaker elements, suitably shaped for being inserted between the branches, suitable to be actuated in rotation or in an oscillating motion by means of drives of the pneumatic or electric type.

In particular, nowadays there are known beater devices comprising lengthened shaped beating elements, for example rod-like or thread-like. Such beating elements can be carried by a suitable support and so actuated in rotation, or articulated to the support itself and actuated in oscillation.

A device of the aforesaid type is illustrated as an example in European patent no. EP1323342 B1 relating to a pneumatic control manual beater device constituted by four beating elements which move two by two through an oscillating motion, on orthogonal planes. Such elements, which have a lengthened tubular shape, are pivoted on a square planted support.

A different type of beater device instead comprises comb shaped beating elements, usually arranged two by two on the support at the end of the support rod. Such elements are suitable to be actuated oscillating between a closed configuration, having the combs arranged facing on parallel planes, and an open configuration, with diverging combs.

Patent EP1040747 discloses an example of comb shaker member shaped by a transverse tubular element whereon there are mounted a plurality of fork shaped prongs.

Patent application no. EP2091317 A1 illustrates a shaker device comprising a body arranged at the top of a support rod and carrying a shaker member suitable to be actuated by means of the interposition of transmission means by actuation means according to a conical pendular motion. The transmission means comprise a lever carried radially by the driving shaft and a support pin connected at one end to the aforesaid lever and at the opposite end to the shaker member. Spherical connection means are provided between the cited connection pin and the box for containing the body of the beater device.

Patent EP1795064 discloses a device for harvesting olives comprising two mobile combs designed to engage with the olives, a support rod for the combs, a central structure from one end of which the rod extends, a grip made on the central structure, a motor for moving the combs, means for transmitting motion form the motor to the combs.

International patent publication no. WO03/030625 discloses an olive picking beating tool, which allows an optimized penetration into the depth of a high-productivity plant, while using a low power motor drive, such as a small battery-operated motor.

Patent GR 97100436 discloses a device for collecting olives, equipped with a vibratory comb which is composed of a specific head designed to convert the rotary motion into eddy motion so that the comb flexible spindles which come in contact with the branches, shake these last and detach the fruit without damaging them or the leaves of the trees. The head is adapted to the top of the tubular pole which permits the shaft to go through; the rotary motion is conveyed to the shaft either directly from a small electromotor or via a cable from a portable or ground petrol engine or from a greater driving unit (e.g. milling-machine). In the case of cable drive, the pole can be adjustable in length thanks to its telescopic construction.

The described devices have made the olive harvesting operations faster and easier, nevertheless they still present non negligible drawbacks.

First of all, such devices have rather complex structures, difficult to assemble and laborious to disassemble in case of maintenance.

Furthermore, known devices have considerable bulk dimensions and weight, sometimes not perfectly equilibrated. For this reason, inserting the shaker members between the branches of the trees can turn out problematic and hard for the operator. As a consequence, the risk of damaging the plants increases because of the use of such devices. In fact a use not well controlled by the operator can lead to scratch or even to shear the branches of the trees, at the germinable part, compromising in such a way the production of fruits for the following year. Such a risk turns out to be worse by the arising of undesired vibrations due to the actuation of the beating elements, if these latter are not perfectly equilibrated.

DISCLOSURE

The task of the present invention is that of solving the aforementioned problems, devising an apparatus that allows to perform in an efficient and safe way the picking of olives and similar products.

Within such a task, a scope of the present invention is to provide an apparatus for picking olives which has a compact structure and is easy to use by the operator.

Another scope of the present invention is to provide an apparatus for picking olives that is easy to assemble and maintain.

A further object of the present invention is that of providing an apparatus for picking olives having a simple conception and a reliable structure.

The above mentioned scopes are attained, according to the present invention, by the apparatus for picking olives and similar products according to claim 1.

DESCRIPTION OF DRAWINGS

Details of the invention shall be more apparent from the detailed description of a preferred embodiment of the apparatus for picking olives and similar products, illustrated for indicative purposes in the attached drawings, wherein.

BEST MODE

With particular reference to such figures, the apparatus for picking olives and similar products according to the invention is indicated in its entirety with 1. The apparatus comprises a preferably tubular shaped support rod 2, at the top of which there is applied a shaker unit 3.

Figure 1:
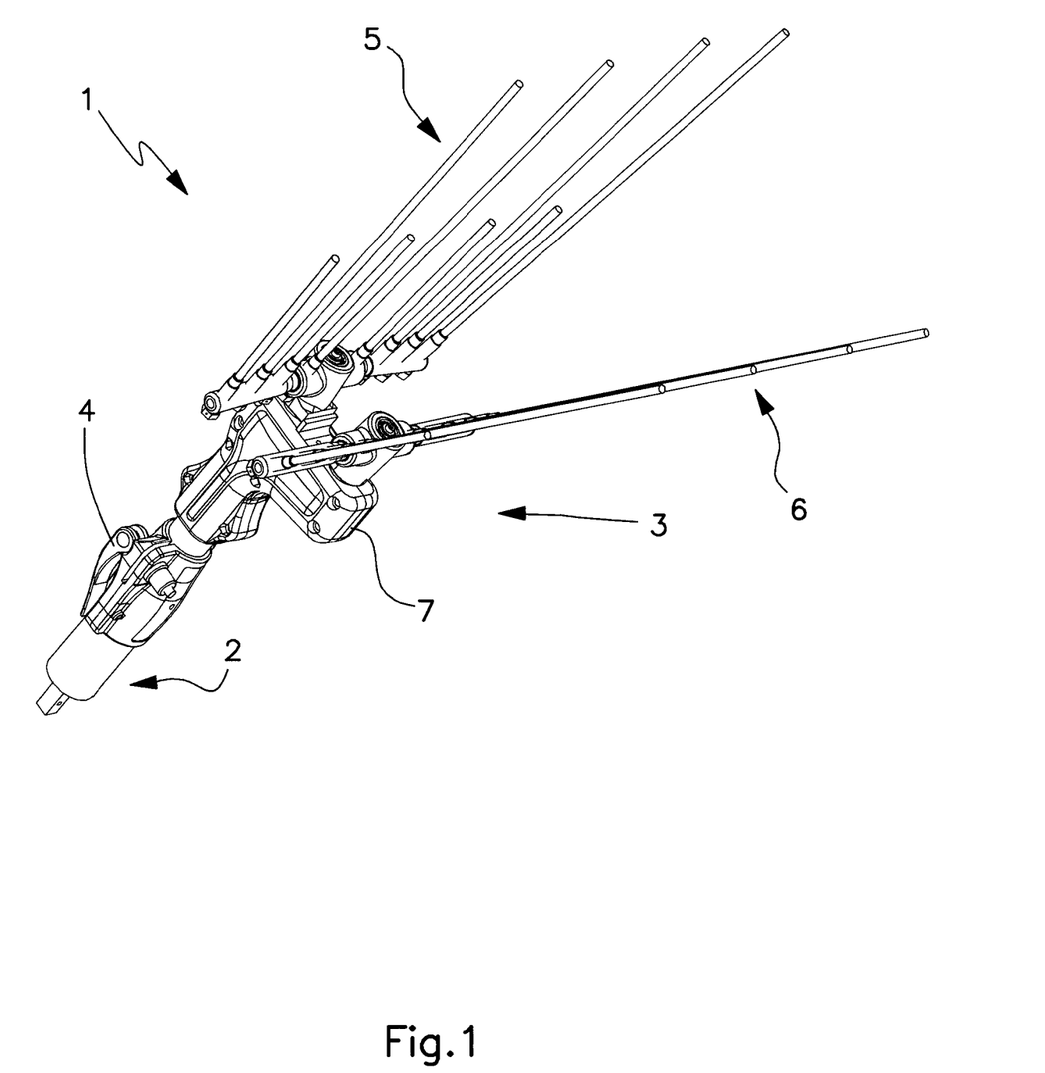
FIG. 1 shows a perspective view of a portion of the apparatus for picking olives according to the invention.

The support rod 2 is preferably of the telescopic type and therefore is provided with a suitable lever 4, distal with respect to a handle 200, for setting the length (see FIG. 1).

Inside a wrapping 201 for example made of plastic, suitable to define the handle 200 of the rod 2, there are housed electric connection means 202 to enable the supply of the electric energy used for actuating the shaker unit 3, for example by a generator of the battery type. The handle is provided with control means 203 of known type, suitable to control the supply or interruption of power supply provided by the aforesaid supply means (see FIG. 2). The energy supply means can comprise, for example, an electric battery for automotive use, or a shoulder-mounted battery. The shaker unit can also be actuated by an electric motor connected to an electric power generator or to the electric system, by an internal-combustion engine, or by a pneumatic system.

According to a particular embodiment, advantageous if realized both jointly and separately with respect to the essential technical features of the apparatus according to the invention, the control means 203 provide a single switch that incorporates a thermal disjuncter, suitable to interrupt the power feed in case of overloads or of other anomalous events, in order to preserve the electric components present in the apparatus 1. The insertion of the thermal disjuncter integrated to the control means 203, in particular, makes the use of reset switches and/or of dedicated safety components unnecessary, at the advantage of compactness, reliability and inexpensiveness of the apparatus.

Figure 2:
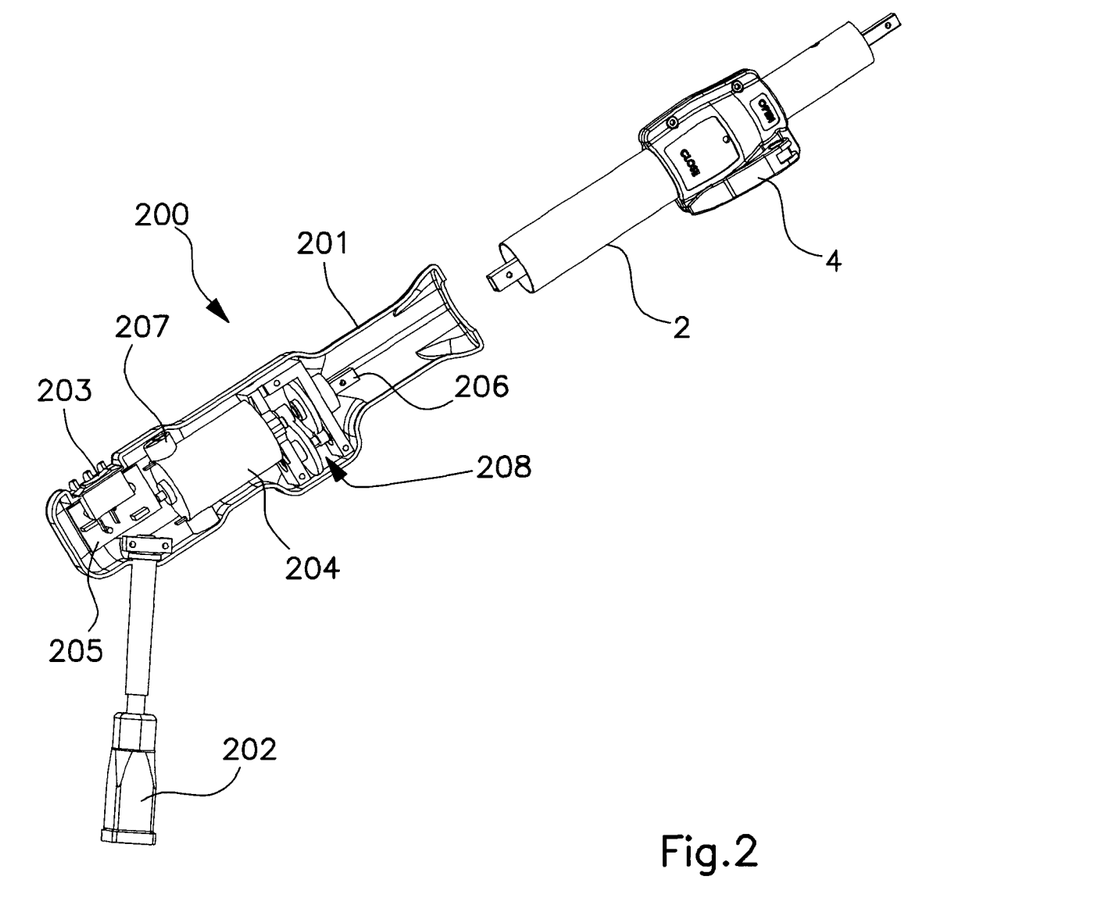
FIG. 2 shows an exploded perspective view of the grip portion of the apparatus according to an embodiment.
Figure 3:
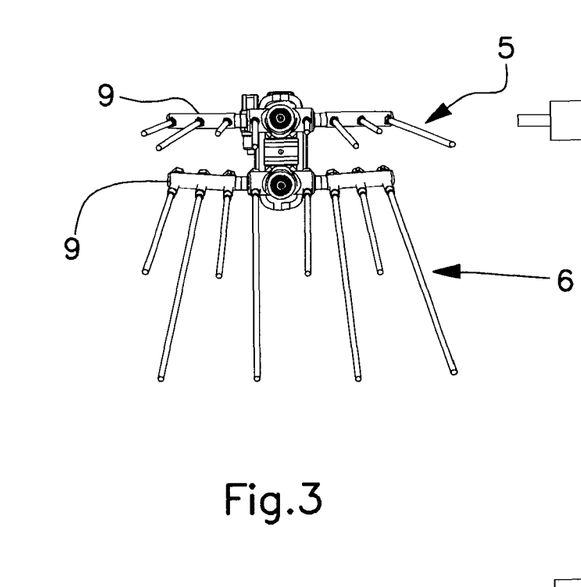
FIGS. 3, 4 and 5 respectively show a top, lateral and front view of the portion of the apparatus illustrated in FIG. 1.

According to a particular embodiment, advantageous if realized both jointly and separately with respect to the essential technical features of the apparatus according to the invention, in a portion of the support rod 2 proximal to the handle there is arranged a motor member 204 electrically connected to the control means 203 through the interposition of an electric control card 205. The motor member 204 is suitable to actuate an outlet shaft 206 suitable to move a user unit arranged downstream, which in the case of the apparatus 1 is the shaker unit 3 arranged at the opposite end of the rod 2. The motor member 204 illustrated in FIG. 2 is of the type provided with brushes preferably replaceable, therefore associated with a speed reducing unit 208 of known type. In alternative, the motor member 204 can be of the so-called "brushless" type, associated with a dedicated electronic card, for modulating the speed and varying the direction of rotation of the outlet shaft 206, in substitution or in addition to the speed reduction unit 208. In any case, the arrangement of the motor member 204 at the handle 200 contributes to balance the weight distribution, so making the use thereof easier and avoiding the use of additional counterweight elements.

The shaker unit 3 comprises at least one comb sector, one containment box 7, inside which there are housed the actuation means 8 for the comb sector itself. In the embodiments illustrated and described in the following, there are provided a first and a second comb sector 5, 6 suitable to be handled by the actuation means 8, but embodiments with a single comb sector are also provided.

Figure 4:
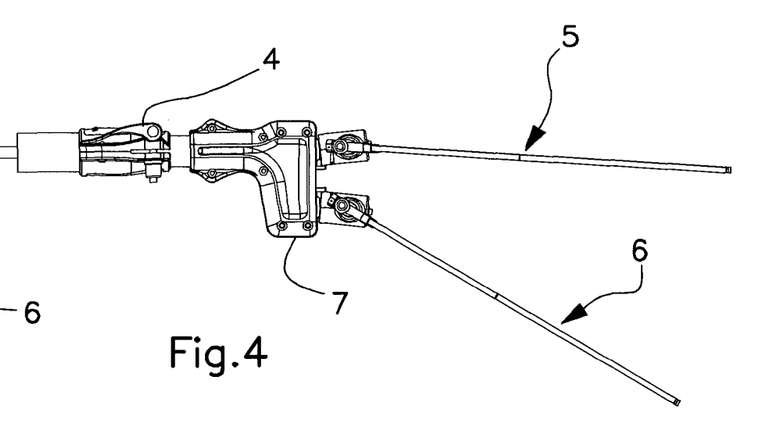
Figure 5:
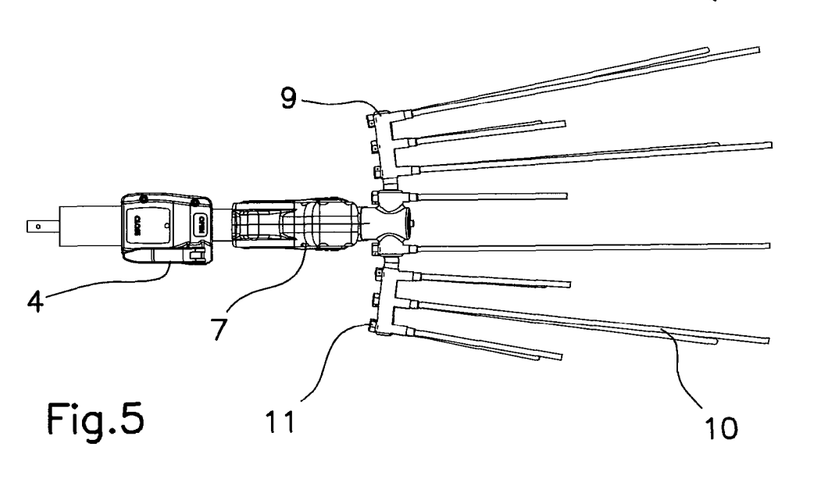

Each comb sector 5, 6 has a crossbar 9 whereon there is engaged in series a plurality of teeth 10, suitably distanced. In the case illustrated in FIG. 1, each comb sector 5, 6 comprises a plurality of tubular shaped teeth 10, which extend, starting from the respective crossbar 9, in substantially rectilinear way. For each sector 5, 6 the teeth 10 are preferably shaped according to two different longitudinal extensions and arranged with alternated extension along the crossbar 9, to make easier, in use, the gradual insertion in the foliage of the tree. Obviously different embodiments of the comb sectors 5, 6 can be used, as an example with undulated, curved or conical development teeth. Moreover the teeth 10 can be arranged on one same longitudinal plane on the respective crossbar 9, as can be seen in particular in FIG. 4, or on alternatively offset longitudinal planes, reciprocally diverging from the crossbar 9. Again, the crossbar 9 can have a tubular shape, for example with a circular, or polygonal triangular or quadrangular section, with the teeth 10 fixed by means of known fixing means 11 at a median axis or close to the peripheral surface.

The crossbar 9 has preferably a circular arc curved longitudinal trend, with convexity oriented towards the support rod 2, so as to allow the teeth 10 fixed to the crossbar 9 to assume a radiated off arrangement, suitable to make easier the insertion between the branches of the tree to be treated. In alternative, to allow the same radiated off arrangement, the crossbar 9 can have different shape, as an example substantially flat with circular segment.

In any case, to give greater stability and rigidity, the crossbar 9 can comprise one or more longitudinal ribbing elements, at one only part or at opposite parts with respect to the plane or to the planes of the teeth 10.

The box 7 is preferably made of two substantially symmetric covers, suitable to be reciprocally fixed so as to contain the actuation means 8 for the comb sectors 5, 6 (see FIGS. 1, 3, 4, 5).

The actuation means 8 for the comb sectors 5, 6 can comprise a wheelwork 12 for transmitting a rotational motion and control means 13 for the motion of the combs, suitable to transform the rotational motion into a substantially tilting motion, as described in detail in the following.

Figure 6:
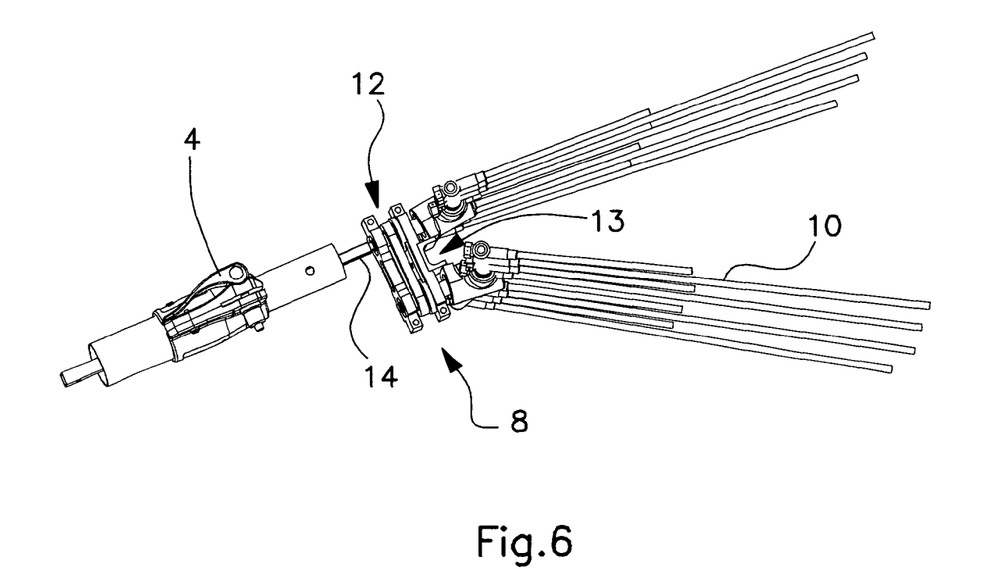
FIGS. 6 and 7 respectively show a perspective and lateral view of the same portion of the apparatus in hand, without containment box for the actuation means.
Figure 7:
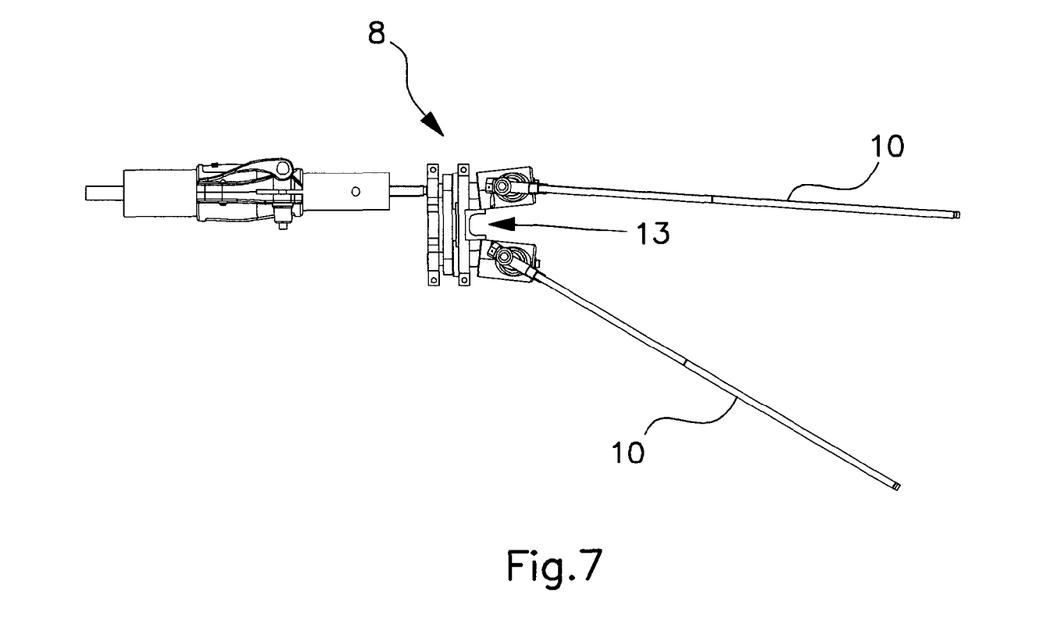

The wheelwork 12 is suitably actuated in rotation by the cited motor member 204 arranged in proximity of the handle of the support rod 2 and connected to the cited power supply means. More precisely the motor member 204 is suitable to actuate in rotation a drive shaft 14 inserted preferably coaxial to the support rod 2 (FIGS. 6 and 7). The drive shaft 14 is suitable to actuate in rotation the wheelwork 12 and, through the control means 13, to transmit to the comb sectors 5, 6 a motion tilting between an opening configuration, at which the sectors 5, 6 are arranged with the respective teeth 10 on reciprocally diverging planes, and a closing configuration, at which the teeth 10 are arranged on approached planes.

Figure 8:
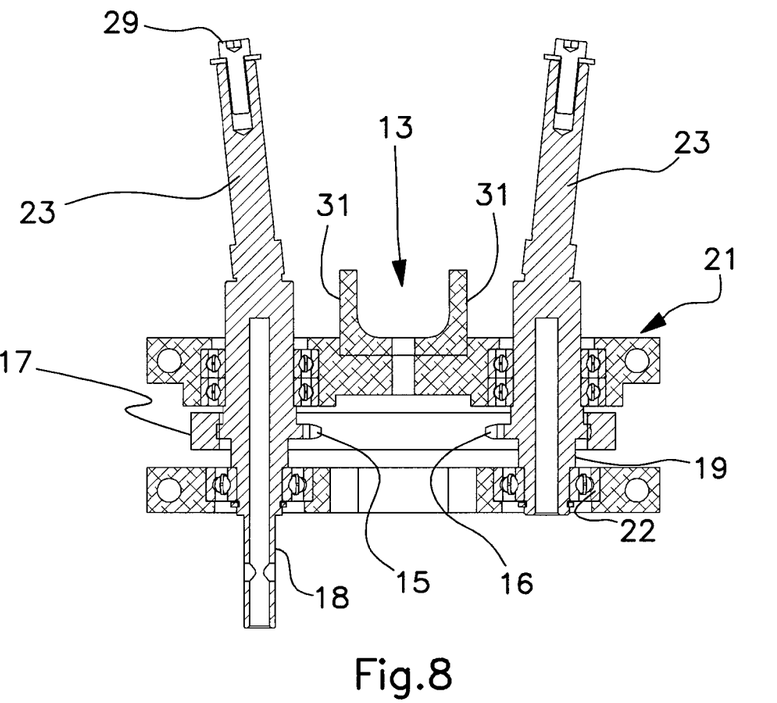
FIG. 8 shows a longitudinal section view of a detail of the apparatus.
Figure 17:
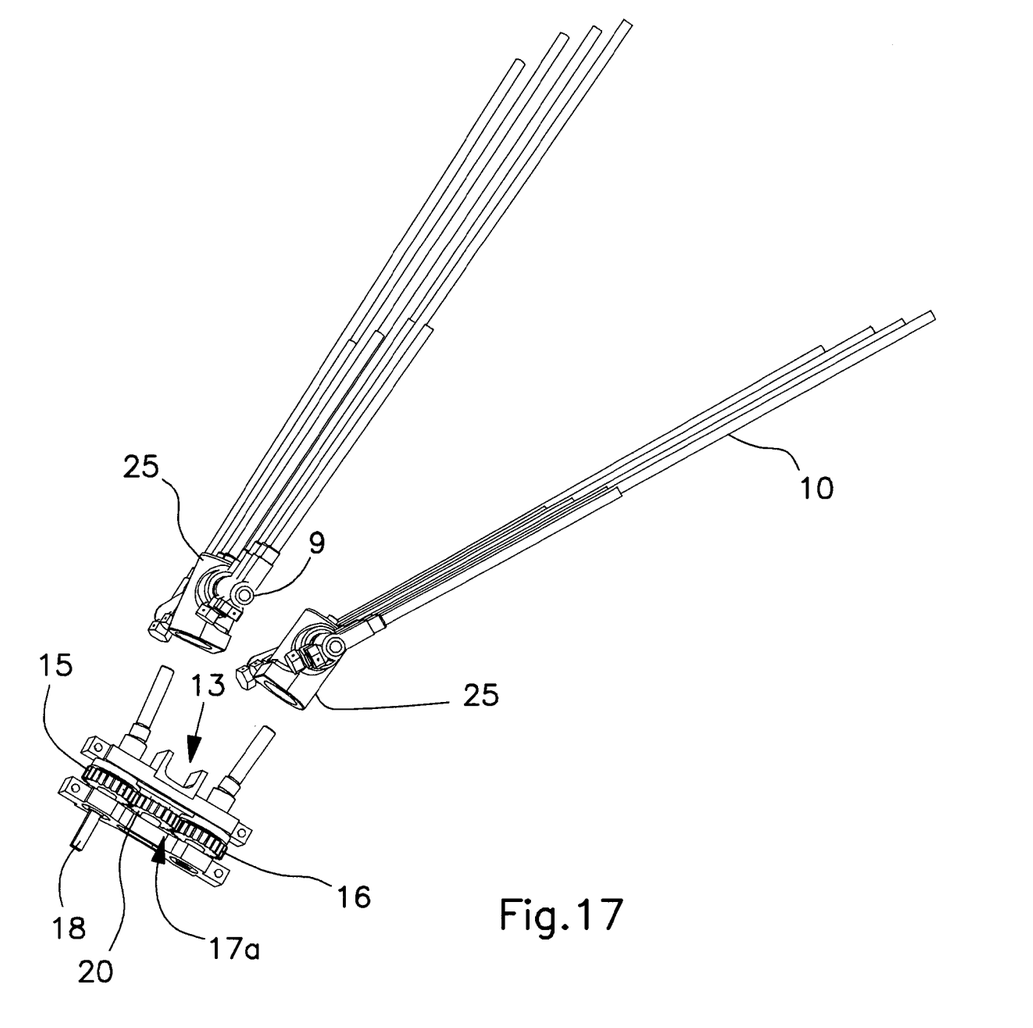
FIG. 17 shows a perspective exploded view of the picking apparatus in hand according to a further embodiment.

More precisely, the wheelwork 12 comprises a first toothed wheel 15 and a second toothed wheel 16 connected through transmission means 17. The first toothed wheel 15 is keyed to a first driven shaft 18 coaxial to the drive shaft 14, while the second toothed wheel is keyed to a second driven shaft 19 distanced parallel to the first driven shaft 18. According to the embodiment illustrated in figures from 6 to 8, the transmission means 17 are realized through toothed belt or chain means (see in particular FIG. 8). Alternatively, according to a further embodiment illustrated in FIG. 17, the transmission means 17*a* can provide a third intermediate wheel or intermediate pinion 20 suitable to transmit the rotational motion from the first toothed wheel 15 to the second toothed wheel 16. In any case, the first driven shaft 18 and the second driven shaft 19 are supported by a support frame 21 by means of the interposition of rolling members 22 of known type (see FIG. 8). The support frame 21, which is preferably constituted by a couple of crossbars transversally opposite to the wheelwork 12, is fixed in a known way to the containment box 7. The components of the actuation means 8 can be realized in various materials, not only metallic, but also and preferably plastic, so as to reduce the total weight of the apparatus.

Figure 9:
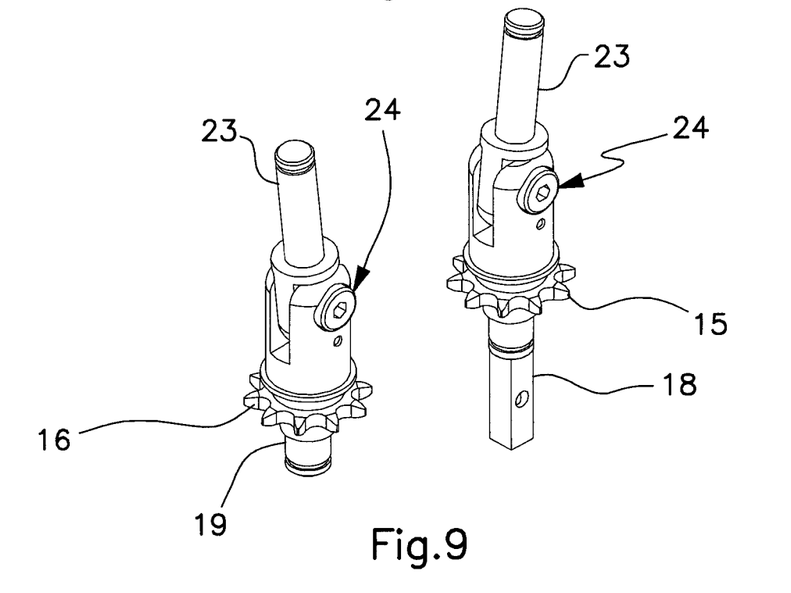
FIG. 9 shows a perspective view of a detail of the apparatus according to a further embodiment.
Figure 10:
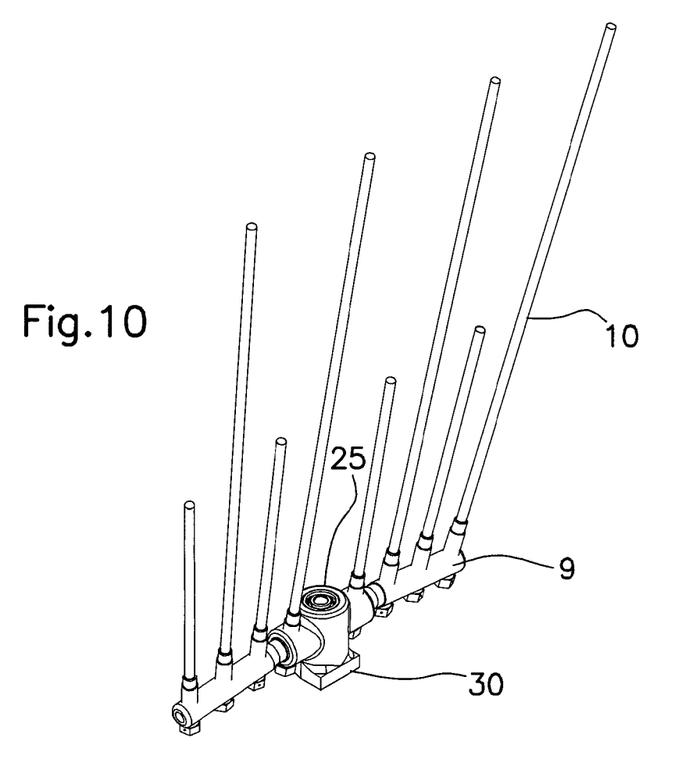
FIGS. 10, 11 and 12 respectively show a perspective, front and lateral view of a detail of the apparatus according to the invention.
Figure 11:
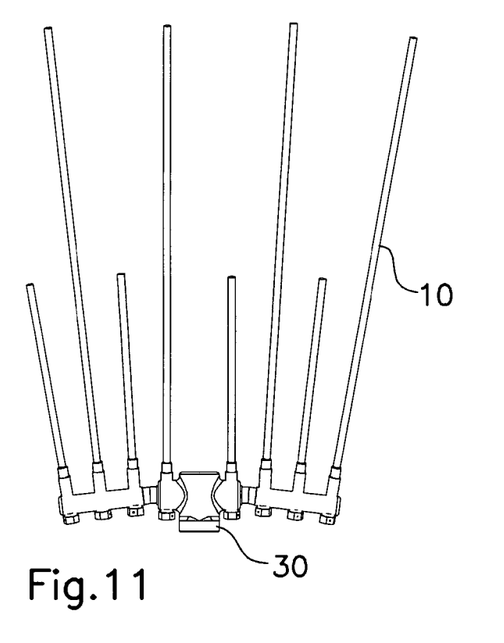
Figure 12:
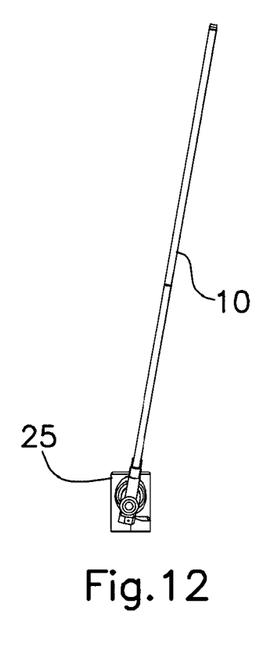

Each driven shaft 18, 19 has an inclined end portion 23, thus suitable to rotate about the axis of the respective driven shaft by effect of the actuation in rotation of the drive shaft 14. According to the embodiment illustrated in particular in FIG. 8, the inclined portion 23 is made in a single piece to the respective driven shaft. In alternative it is possible to provide that the inclined portion 23 is made as a separated component and fixed with an adjustable inclination to the respective driven shaft, for example through articulation means 24 suitably blocked in a removable way (see FIG. 9).

Moreover each inclined portion 23 is inserted mobile inside support means 25 of a respective crossbar carrying the teeth 10. The support means 25 are realized from respective containment wrappings carrying an axial cavity 26 for inserting the inclined portion 23 and a transverse cavity 32 for housing the respective crossbar 9.

The axial cavity 26 shapes housing seats 27 for respective rolling means 28 suitable to be interposed between the wrapping 25 and the inclined portion 23. Furthermore the axial cavity 26 is preferably a through one and suitable to allow the access from outside to the free end of the inclined portion 23 and the axial blocking of this latter to the wrapping 25 through blocking means 29. Such blocking means 29 preferably comprise a closing element, for example a washer of known type, suitable to beat abut the cited rolling means 28, hindering in such a way the access of possible extraneous material inside the wrappings 25. The wrapping 25 therefore results hermetic, thus impenetrable with respect to dirtying substances of external provenance.

Each wrapping 25 is associated with the control means 13 to transform the rotatory motion of each inclined portion 23 into a tilting motion of the comb sectors 5, 6 carried by the support means. More precisely, the control means 13 are made, for each comb sector 5, 6, of a first coupling portion 30, for example substantially flat, carried as an appendage by a respective wrapping 25 and by a second coupling portion 31 for example substantially flat as well, integral to the support frame 21 for the actuation means 8 or to the containment box 7 and arranged facing with a continuous abutment of the first coupling portion 30. In the pendular motion of the inclined portion 23, the second coupling portion is therefore suitable to block the rotation of the wrapping 25 through the continuous abutment to the first coupling portion 30 mobile integrally to the same wrapping 25. More precisely such an abutment occurs through a continuous dragging motion between the both conjugated portions, which results in the tilting motion substantially elliptic of each comb sector 5, 6. The second coupling portions 31 are preferably made of the corresponding walls opposite of a U profiled element or of a tubular element suitably fixed to the frame support 21 (see FIG. 7 as an example) or to the containment box 7.

Figure 13:
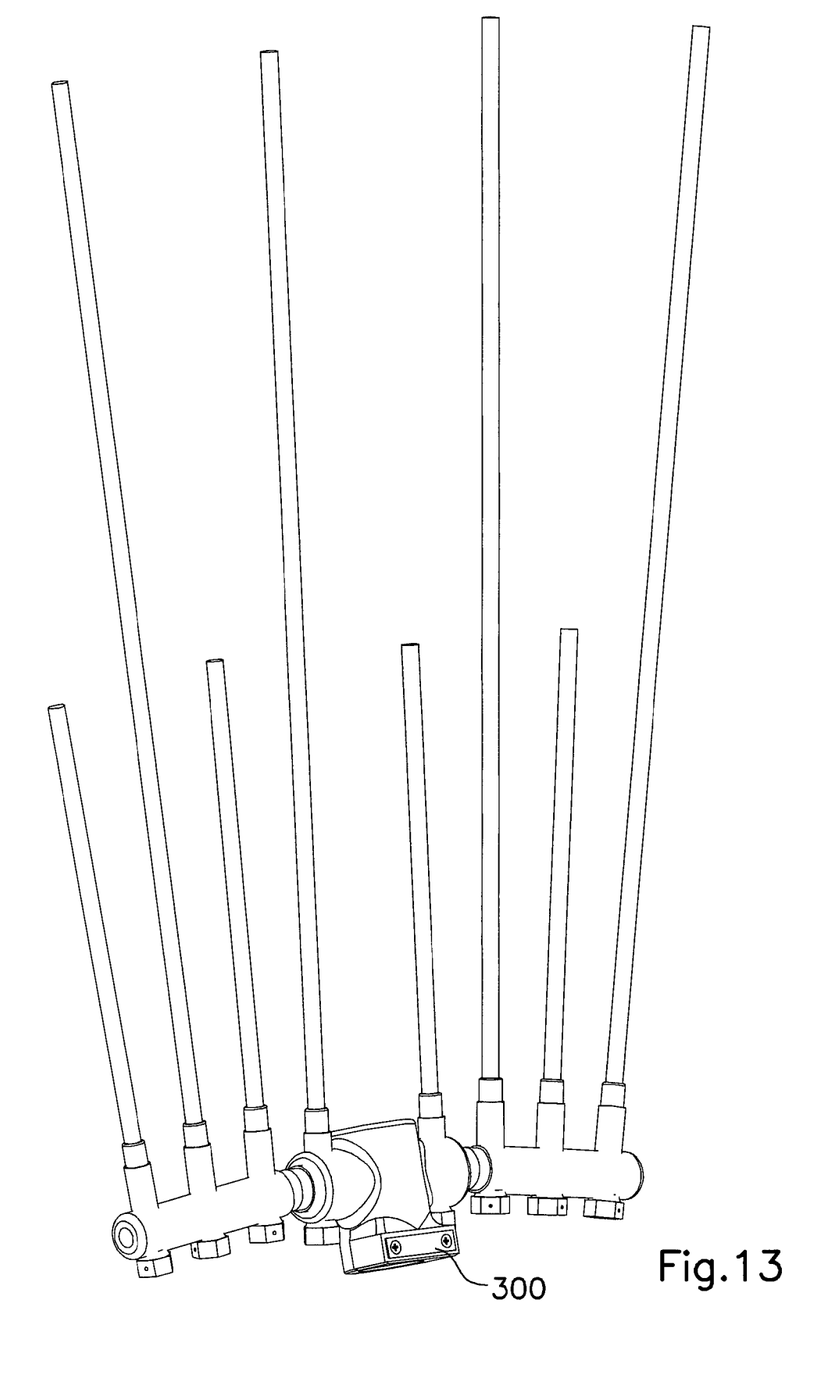
FIG. 13 shows a perspective view of a detail of the apparatus according to a further embodiment.
Figure 14:
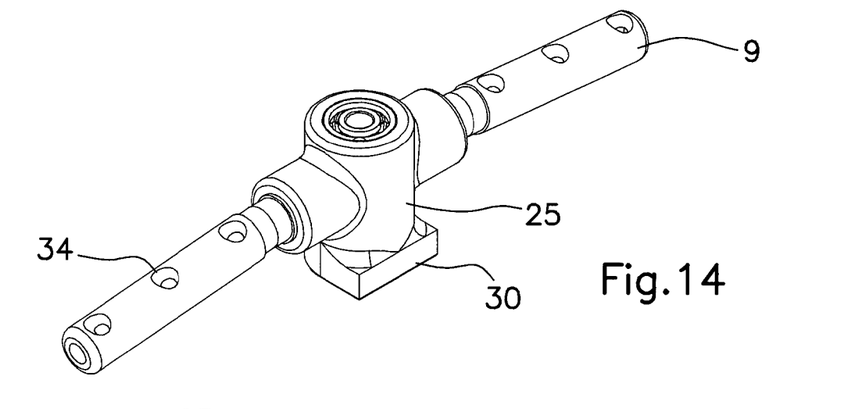
FIGS. 14, 15 and 16 respectively show a perspective view, a sectional view according to the plane XV-XV indicated in FIG. 16 and a top view of a further detail of the apparatus in hand.
Figure 15:
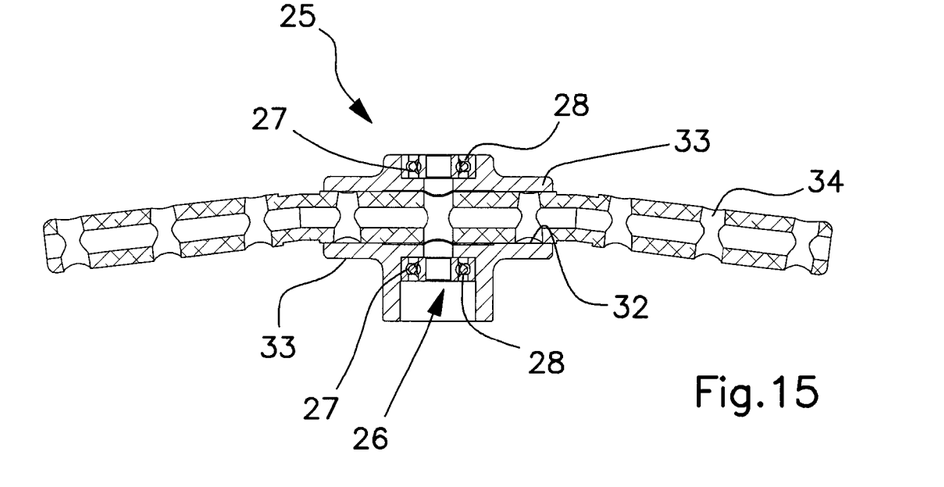
Figure 16:
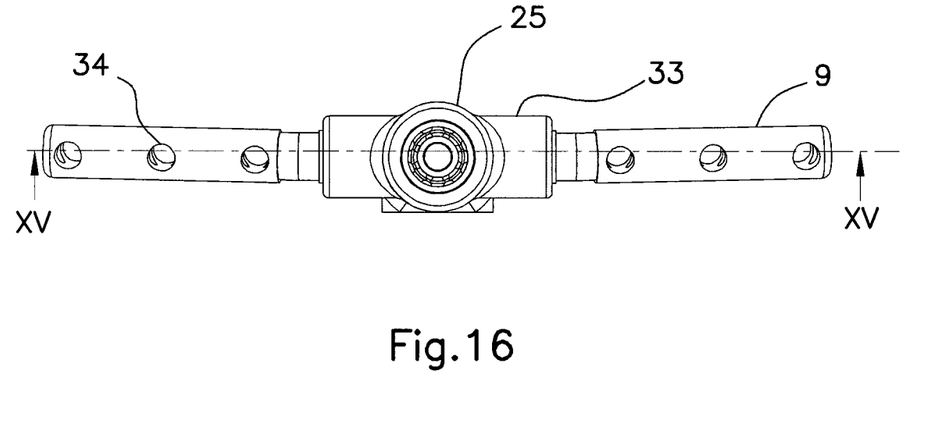

According to an advantageous embodiment illustrated in FIG. 13, the first coupling portion 30 is realized by means of a respective insert 300 applied in a removable way to the wrapping 25, so as to be able to be easily substituted when the wear and tear due to the reciprocal dragging makes it necessary. In alternative or in addition it is possible to provide that the second coupling portion 31 is realized by means of a corresponding insert which can be applied in a removable manner.

In any case it is preferable that the first coupling portion 30 and the second coupling portion 31 are realized of different materials, for example respectively of plastics and metal or vice versa, in order to concentrate the wear and tear mainly on one or on the other.

The cited transverse cavity 32 is preferably perpendicular to the cited axial cavity 26, for inserting a respective crossbar 9. The transverse cavity 32 extends transversely in respective prolongation tubular portions 33 arranged as a T with respect to the central body of the wrapping 25. The crossbar 9 comprises a plurality of transverse holes 34 preferably radial for fixing respective teeth 10 through the fixing means 11.

The functioning of the apparatus for picking olives is described as follows.

In a first step, wherein the motor member is inactive, the operator adjusts the longitudinal extension of the support rod 2 blocking it to the desired extension by means of the lever 4. Then the operator grips the support rod 2 at the handle 200 and lifts it positioning it in a substantially vertical way close to the tree where picking of the olives is intended to be performed.

The rod 2 is then handled so as to progressively insert the comb sectors 5, 6 inside the foliage of the tree.

The motor member is actuated acting on the control means 203 present on the handle 200, triggering the activation of the tilting motion of the comb sectors 5, 6 which, shaking the branches engaged thereby, trigger the detachment of the olives which are then picked on the ground.

Suitably displacing the shaker means between the foliage of the tree, it is possible to complete the picking of the olives.

At the end of the picking operations the actuation means for the comb sectors 5, 6 are deactivated in order to put the tool back or to perform the picking on further trees.

The apparatus for picking olives and similar products therefore allows to attain the scope of performing in an efficient and safe way the picking of the olives and similar products.

This technical scope is attained in particular thanks to the support means 25 cooperating with the control means 13 externally to the containment box 7. Moreover the control means 13 are suitable to control in a safe and reliable way the transformation of the rotary motion of the driven shafts 18, 19 into a tilting motion, in particular pendular, of the comb sectors 5, 6. The technical solution proposed by the invention consists of providing substantially flat coupling portions 30, 31 which cooperate in a continuous and efficient manner to block the rotation of the wrappings 25 coupled in a turning way to the inclined portions 23.

A characteristic of the invention consists of the fact that the support means 25 for the crossbars 9 can be assembled in a very simple way simply engaging them on the respective inclined portions 23 and blocking them with the blocking means 29. As underlined in the preceding, the support means 25 result completely external to the containment box 7, so allowing the mounting successive to the closing of this latter. Also the control means 13 operate externally to the containment box 7, in particular providing both the first coupling portions 30 and the second coupling portions 31 cooperating outside the box 7.

It is also to observe that the support means 25 with the respective comb sectors 5, 6 can be easily substituted to fit the shaker means to the exigencies of use, as an example for picking products of different type, without requiring the disassembly of the containment box 7 of the apparatus 1 and of any component contained therein.

The structural simplicity as well as the arrangement of the support means 25 contribute to an optimal functioning of the apparatus 1 also with respect to the requirement of cleaning. In facts, the wrappings 25 protect in a safe way the internal components in movement, particularly thanks to the closing means integrated to the blocking means 29, further to the essentiality of the fixing means necessary to block the comb sectors 5, 6 to the support means 25. To such an end is in fact sufficient the use of a grain or other screw element to fix in a safe way the crossbar to the respective wrapping 25.

The solution proposed by the invention therefore has the considerable advantage of optimally simplifying the mechanical structure of the apparatus 1, by also the reciprocal restraint supports between the components. For example the connection between the wrappings 25 and the crossbars 9 is given to a reduced number of elements, the cited grains, so as to avoid the formation of redundant restraints which can create undesired tensioning of the combs. In fact the crossbars 9 also with a simple transverse fixing grain can be steadily blocked in position at a central portion, letting freely protruding the end portions from the tubular portions 33.

Furthermore the same essentiality of components and reciprocal restraints avoids anomalous hardenings, in particular between the crossbars 9 and the wrappings 25, reducing the risk of arising of undesired vibrations during use to the minimum.

A further advantage of the device is represented by the compactness and by the reduced total weight of the apparatus. In fact, particularly in the case wherein the transmission means 17 are realized through belt or flexible chain, the number of mechanical components of the apparatus results minimal.

The technical solution which provides the use of transmission means 17 of flexible belt or chain type has also the advantage of offering the possibility of adjusting the distance or wheelbase between the driven shafts 18, 19, simply providing, at the design stage, flexible transmission means 17 having a length corresponding to the desired wheelbase. Moreover it is to note that the belt flexible type transmission means 17 enable an efficient functioning also in absence of lubricating substance, with further reduction of the costs of use.

The solution wherein the components of the actuation means 8, in particular the toothed wheels 15 and 16, are made of plastics results particularly advantageous from the point of view of the lightness of the apparatus.

A characteristics of the invention further consists of the fact that the actuation means 8 associated with the comb sectors 5, 6 do not encumber if not in minimal measure the foliage of the tree, interacting in a safe and gradual way with it. On the contrary, the equipment of the apparatus with combs having teeth radially arranged, preferably on offset diverging plans, allows a not invading, but gradual and delicate insertion between the branches. As a consequence, possible damages to the delicate parts of the plant, such as branches or foils, are reduced to the minimum, so as to maintain unaltered the potential future productivity of the plant.

Further to this it is important to observe that, for the particular arrangement of the actuation means 8 inside the containment box 7 and the motor member close to the handle 200, the apparatus turns out to be very ergonomic, light to lift and to handle, as well as perfectly balanced. In fact the user does not have to perform fatiguing efforts to transport the apparatus from a tree to another and even does not have to perform efforts to support it during the picking operations. Also the actuation of the motor member 204 is very easy, through the simple pressure of the switch control means 203 provided on the handle of the rod 2.

Eventually the apparatus according to the invention is of very versatile use as it can be adapted for picking any type of small fruit. In fact it is sufficient to substitute the couple of comb sectors 5, 6 with means shaped in a suitable way for the specific fruit to be picked, to fit the apparatus to any type of picking.

In practice, the embodiment of the invention, the materials used, as well as the shape and dimensions, may vary depending on the requirements.

Should the technical characteristics mentioned in each claim be followed by reference signs, such reference signs were included strictly with the aim of enhancing the understanding the claims and hence they shall not be deemed restrictive in any manner whatsoever on the scope of each element identified for exemplifying purposes by such reference signs.

The invention claimed is:

1. An apparatus for picking olives and similar products, the apparatus comprising:
    a support rod suitable to be grasped;
    a shaker unit comprising a containment box suitable to be mounted at a top of said support rod;
    at least one comb sector shaping a crossbar provided with a plurality of teeth, carried mobile by said containment box;
    a motor member for actuating said comb sector in a substantially tilting motion;
    a drive shaft arranged substantially aligned to a longitudinal axis of said support rod and suitable to be actuated in a rotary motion by said motor member, said drive shaft being associated with at least one respective driven shaft shaping an inclined end portion;
    a bearing means for said crossbar of said comb sector suitable to be inserted rotatably on said inclined portion of said at least one respective driven shaft through an interposition of a rolling means
    a control means for controlling the motion of said comb sector, associated with said bearing means, said bearing means being suitable to cooperate reciprocally abutting with said control means in correspondence of respective coupling portions, externally to said containment box, to transform said rotary motion actuated by said motor member into said tilting motion of said comb sector.

2. An apparatus according to claim 1, wherein said coupling portions comprise a first coupling portion integral to said bearing means and a second coupling portion beside said first coupling portion and arranged fixed with respect to said containment box, said first coupling portion and said second coupling portion being suitable to be carried in a relative motion of reciprocal abutment to transform said rotary motion of said at least one driven shaft into said tilting motion of said at least one comb sector.

3. An apparatus according to claim 2, wherein said second coupling portion is made by a corresponding substantially flat wall of a U-profiled element or of a tubular element fixed with respect to said containment box.

4. An apparatus according to claim 2, wherein said coupling portions are made by respective inserts suitable to be fixed in a removable way.

5. An apparatus according to claim 2, wherein said bearing means have a shape of casing comprising an axial cavity for axially inserting said inclined portion externally to said containment box, said casing being suitable to be fixed to said inclined portion through a fixing means externally to said box.

6. An apparatus according to claim 5, wherein said casing comprises a transverse cavity suitable to house a central portion of said crossbar.

7. An apparatus according to claim 5, wherein said crossbar has a substantially circular arc curved trend and said crossbar comprises a plurality of transverse holes for radially positioning respective teeth.

8. An apparatus according to claim 2, wherein said inclined portion is connected through an articulation means and fixed according to an adjustable inclination to an end of said driven shaft.

9. An apparatus according to claim 1, further comprising:
another driven shaft, said at least one driven shaft and said another driven shaft being connected to said drive shaft though a wheelwork, said at least one driven shaft and said another driven shaft being suitable to be actuated with a rotary motion according to an axis parallel to an axis of said drive shaft and each of said at least one driven shaft and said another driven shaft shaping a respective said inclined end portion, said at least one drive shaft being inserted to said bearing means of said first comb sector and said another driven shaft being inserted to said bearing means of said second comb sector, said at least one driven shaft and said another driven shaft being suitable to be actuated through cooperation of said corresponding control means into said motion substantially tilting between an opening configuration with diverging combs and a closing configuration with approached combs.

10. An apparatus according to claim 9, wherein said wheelwork comprises a first toothed wheel keyed to said at least one driven shaft coaxially to said drive shaft and a second toothed wheel keyed to said another driven shaft, said wheelwork being actuated through a transmission means of a flexible type with a chain or a belt wrapped to said first toothed wheel and said second toothed wheel.

11. An apparatus according to claim 9, wherein said wheelwork comprises a first toothed wheel keyed to said at least one driven shaft and a second toothed wheel keyed to said another driven shaft, said wheelwork being actuated in rotation through an interposition of an intermediate sprocket between said first toothed wheel and said second toothed wheel.

* * * * *